(12) United States Patent
Koser

(10) Patent No.: US 10,296,922 B2
(45) Date of Patent: May 21, 2019

(54) TECHNIQUES FOR CUSTOMIZED DEPLOYMENT OF OFFERS

(75) Inventor: Vincent Robert Koser, West Lafayette, IN (US)

(73) Assignee: NCR Corporation, Atlanta, GA (US)

( * ) Notice: Subject to any disclaimer, the term of this patent is extended or adjusted under 35 U.S.C. 154(b) by 866 days.

(21) Appl. No.: 13/434,936

(22) Filed: Mar. 30, 2012

(65) Prior Publication Data

US 2013/0262235 A1 Oct. 3, 2013

(51) Int. Cl.
*G06Q 30/02* (2012.01)

(52) U.S. Cl.
CPC ......... *G06Q 30/02* (2013.01); *G06Q 30/0237* (2013.01); *G06Q 30/0238* (2013.01); *G06Q 30/0253* (2013.01); *G06Q 30/0268* (2013.01)

(58) Field of Classification Search
CPC .................................................. G06Q 30/0271
USPC ...................................................... 705/14.67
See application file for complete search history.

(56) References Cited

U.S. PATENT DOCUMENTS

| | | | | |
|---|---|---|---|---|
| 6,279,112 B1* | 8/2001 | O'Toole, Jr. | ........... | G06Q 20/02 705/14.26 |
| 2002/0194483 A1* | 12/2002 | Wenocur | ............... | G06Q 10/107 713/185 |
| 2004/0093587 A1* | 5/2004 | Sesma | ...................... | G06F 9/465 717/118 |
| 2004/0249712 A1* | 12/2004 | Brown et al. | ................... | 705/14 |
| 2005/0044197 A1* | 2/2005 | Lai | ........................ | G06Q 10/10 709/223 |
| 2007/0256055 A1* | 11/2007 | Herscu | ....................... | G06F 8/51 717/115 |
| 2009/0271771 A1* | 10/2009 | Fallows | .............. | G06F 9/45516 717/137 |
| 2009/0307143 A1* | 12/2009 | Reistad | .................. | G06Q 30/06 705/80 |
| 2010/0145789 A1* | 6/2010 | Upadhya | ................ | G06Q 30/02 705/14.38 |
| 2010/0153205 A1* | 6/2010 | Retter et al. | ................ | 705/14.26 |
| 2010/0174598 A1* | 7/2010 | Khan et al. | ................ | 705/14.32 |
| 2011/0145049 A1* | 6/2011 | Hertel et al. | ............... | 705/14.23 |
| 2011/0173695 A1* | 7/2011 | Ginter | ..................... | G06F 21/10 726/21 |
| 2011/0276400 A1* | 11/2011 | Kurnit et al. | .............. | 705/14.55 |
| 2012/0096490 A1* | 4/2012 | Barnes, Jr. | ............. | G06Q 10/02 725/34 |
| 2012/0117554 A1* | 5/2012 | Meijer | ................ | G06F 9/44521 717/166 |

(Continued)

OTHER PUBLICATIONS

Application on demand system over the Internet, Bouras et al., Journal of Network and Computer Applications 28 (2005) 209-232.*

(Continued)

*Primary Examiner* — David J Stoltenberg
(74) *Attorney, Agent, or Firm* — Schwegman, Lundberg & Woessner

(57) ABSTRACT

Techniques for customized deployment of offers are provided. Customized offers are packaged into a description, a presentation, and offer evaluation execution logic and deployed to an enterprise system. Portions of the package's execution logic have access to some resources of the enterprise system. Once the customized offers are deployed, they can be pushed or pulled to point-of-sale devices for redemption processing during transactions with consumers.

19 Claims, 3 Drawing Sheets

(56) References Cited

U.S. PATENT DOCUMENTS

2013/0047135 A1* 2/2013 Joshi .................. G06F 8/30
717/120

OTHER PUBLICATIONS

Balancing Performance, Energy, and Quality in Pervasive Computing, Flinn et al., Proceedings of the 22 nd International Conference on Distributed Computing Systems (ICDCS'02), 2002.*
Self-limed Remote Execution for Pervasive Computing, Flinn et al., School of Computer Science Carnegie Mellon University, 2001.*

* cited by examiner

TECHNIQUES FOR CUSTOMIZED DEPLOYMENT OF OFFERS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

In large part due to the advancement and use of technology coupled with the adoption of kiosks, enterprises are trying to find new mechanisms to reach consumers with offers for their goods and services that use the current technology effectively and that are capable of being used by consumers via their own devices or kiosks.

Traditional offer management systems require modifications for deployment of new offer functionality. These modifications require extensive testing and affect numerous other existing components of the offer management systems, since new functionality is tightly coupled to the existing infrastructure. Because of the tightly coupled environments, making any modification to provide new offer functionality becomes a risky proposition when the enterprise wants to deploy the new offer functionality into live retail environments or into newer technology and platforms.

SUMMARY

In various embodiments, techniques for customized deployment of offers are presented. According to an embodiment, a method for customized deployment of an offer is provided.

Specifically, a document descriptor is received that identifies items and conditions for providing a customized offer. A document presenter is acquired that defines how the customized offer is presented. A plug-in executor is obtained and configured to execute the conditions using the items to present the customized offer as defined by the document presenter. Finally, the document descriptor, the document presenter, and the plug-in executor are packaged into an encapsulated customized offer deployed to an enterprise retail offer management system.

DETAILED DESCRIPTION

Figure 1:
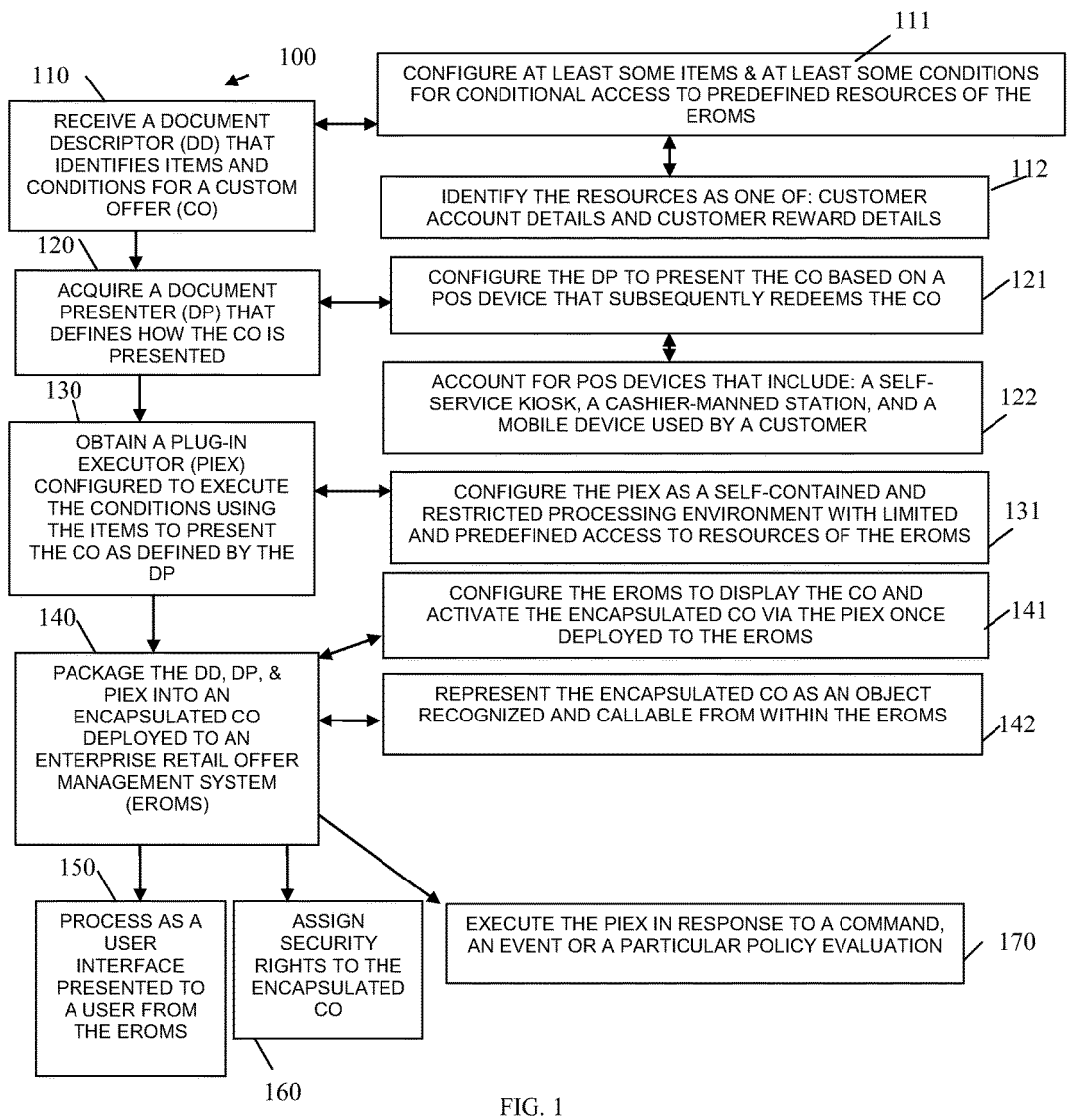
FIG. 1 is a diagram of a method for customized deployment of an offer, according to an example embodiment.

FIG. 1 is a diagram of a method 100 for customized deployment of an offer, according to an example embodiment. The method 100 (hereinafter "custom offer deployment manager") is implemented as instructions programmed and residing on a non-transitory computer-readable (processor-readable) storage medium and executed by one or more processors (e.g., server, cloud, virtual machine (VM), etc.) over a network connection. The processors are specifically configured and programmed to process the custom offer deployment manager. The custom offer deployment manager operates over a network. The network is wired, wireless, or a combination of wired and wireless.

The custom offer deployment manager executes on one or more processors of over a network connection. The custom offer deployment manager once deployed interacts over the network connection with a variety of devices, such as: a mobile device (via an app, may also be referred to as a "mobile agent" herein), a checkout system (self-service kiosk or cashier-manned station), a website, and the like.

Moreover, the custom offer deployment manager can be hosted within a network controlled by a retail establishment in which it is deployed or can be hosted via third-party enterprises as a service provided to that retail establishment. Thus, a retail establishment can outsource deployment and management of the custom offer deployment manager to different vendors or suppliers of the establishment.

In an embodiment, the custom offer deployment manager is accessible via a cloud processing environment over the Internet. The cloud processing environment includes one or more processing environments configured to deploy and operate the custom offer deployment manager via an Internet connection having Application Programming Interfaces (APIs) to interact with a variety of point-of-sale (POS) devices (customer's mobile device, checkout station (self-service kiosk or cashier-manned station), website, and the like.

Various embodiments of the invention provides a technique for packaging the description of a custom offer, the presentation of the custom offer, and the execution for processing and handling the custom offer. The package can be deployed in an enterprise environment and made available to POS devices for execution and processing and in part utilizes existing systems of the enterprise legacy systems.

Initially, some context of the various embodiments is provided before directly discussing the processing of the custom offer deployment manager with reference to the FIG. 1.

Some Example Components:

Offer Plug-in modules include several standardized components. In an embodiment, operation is represented by an object describing the offer structure. This object may be eXtensible Markup Language (XML) or some other form of descriptive data. This includes information about offer components, such as items required for evaluation logic around conditions and rewards and other necessary items. This object is leveraged as the descriptor for how the Plug-in evaluates the offer. The Plug-in executor also leverages the Document Descriptor to determine how to evaluate the offer. The plug-in has access to a limited set of controlled data elements from the enterprise system.

Sample Components of the Packaged Offer Plug-in
Offer Plug-in components:
Document Descriptor
Document Presenter
Plug-in executor
Access:
Once the above components are deployed in the enterprise system the new unique offer logic represented by the Plug-in is immediately viewable in the enterprise offer builder and executable in the offer execution engine.

The Plug-in may have access to the following system components of an enterprise:
Customer points in "exposed" programs
  Increment/Decrement/Get Balance
  Issuance Submission module
  Engine reward generation methods
    Issue discount
    Issue printed message
    Issue cashier message
    Group Membership
    Other reward items
Use:

Deployment and use of an Offer Plug-in includes the following sequence of operations:
1. Document Descriptor
2. Document Presenter
3. Plug-in executor
4. Prepare the Plug-in package
5. Upload the Plug-in package to the enterprise system
6. Create offers based on the Plug-in using the Enterprise offer management Plug-in Presenter
7. Deploy the offers It is within this context that the processing of the custom offer deployment manager with reference to the FIG. 1.

At 110, the custom offer deployment manager receives a document descriptor that identifies items and conditions for a custom offer. The items may include the product or products to which the custom offer applies, and may include additional items used by the conditions, such as customer identifier to access a customer account, a customer reward program and the like. The conditions define when the custom offer can be redeemed and under what circumstances, the conditions use the items and perhaps global policy settings, such as expiration dates, geographic limitations, and the like. The document descriptor is custom defined by a business unit, manufacture, store, distributor, etc.

According to an embodiment, at 111, the custom offer deployment manager configures at least some of the items and at least some of the conditions for conditional access to predefined resources of an enterprise retail offer management system.

Continuing with the embodiment of 111 and at 112, the custom offer deployment manager identifies the resources as one of: customer account details and customer reward details (for any available loyalty program).

At 120, the custom offer deployment manager acquires a document presenter that defines how the CO is presented or delivered for processing by a customer or a cashier at a POS location. Again, this document presenter is customized by the developer of the customized offer as discussed above at 110.

In an embodiment, at 121, the custom offer deployment manager configures the document presenter to present the customized offer based on a POS device that subsequently attempts to redeem the customized offer.

Continuing with the embodiment of 121 and at 122, the custom offer deployment manager accounts for the POS devices that include, by way of example: a self-service kiosk, a cashier-manned station, and a mobile device used by a customer.

At 130, the custom offer deployment manager obtains a plug-in executor that is configured to execute the conditions using the items from the document descriptor and to present the customized offer as defined by the document presenter.

In an embodiment, at 131, the custom offer deployment manager configures the plug-in executor as a self-contained and restricted processing environment with limited and predefined access to resources of the enterprise retail offer management system.

At 140, the custom offer deployment manager packages the document descriptor, the document presenter, and the plug-in executor into an encapsulated customized offer that is deployed to the enterprise retail offer management system.

In one scenario, at 141, the custom offer deployment manager configures the enterprise retail offer management system to display the customized offer and activate the encapsulated customized offer via the plug-in executor once deployed to the enterprise retail offer management system.

In yet another case, at 142, the custom offer deployment manager represents the encapsulated customized offer as an object recognized and callable from within the enterprise retail offer management system.

According to an embodiment, at 150, the custom offer deployment manager is presented and processed, at least in part, as an interactive graphical user interface (GUI) presented to the user via the enterprise retail offer management system.

In one case, at 160, the custom offer deployment manager assigns security rights to the encapsulated customized offer within the enterprise retail offer management system.

In one circumstance, at 170, the custom offer deployment manager executes the plug-in executor in response to a command, an event, and/or a particular policy evaluation. So, the customized offer can lie ready for activation when directed to do so by manual command, by event, or by successful evaluation of a particular enterprise policy.

The processing of the custom offer deployment manager defines how a customized offer is encapsulated and self-contained and deployed to an enterprise retail offer management system. Once deployed, the processes associated with redeem the offer is discussed below with reference to the FIG. 2.

Figure 2:
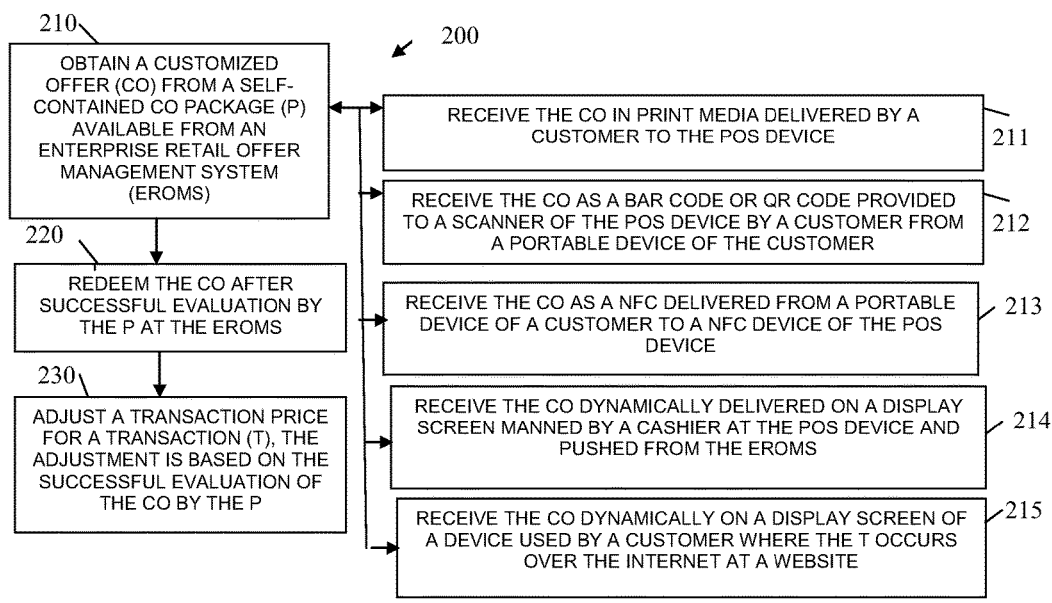
FIG. 2 is a diagram a method for processing an offer that was custom deployed, according to an example embodiment.

FIG. 2 is a diagram a method 200 for processing an offer that was custom deployed, according to an example embodiment. The method 200 (hereinafter "custom offer agent") is implemented as instruction and programmed within a non-transitory computer-readable (processor-readable) storage medium that executes on one or more processors of a consumer's mobile device (e.g., smart phone, tablet, PDA, laptop, etc.), a self-service kiosk device, a cashier-manned device, or any computing device for which the customer offer can be delivered (for example within a browser on a desktop computer, laptop, etc.); the processors of these devices are specifically configured to execute the custom offer agent. The custom offer agent is also operational over a network; the network is wired, wireless, or a combination of wired and wireless.

The custom offer agent interacts with the custom offer deployment package described and deployed by the custom offer deployment manager (discussed above with reference to the FIG. 1) to provide novel techniques for processing custom deployed offers.

At 210, the custom offer agent obtains a customized offer from a self-contained customized offer package available from an enterprise retail offer management system. The manner that the customized offer is defined and deployed was presented in detail above with reference to the FIG. 1. Moreover, the manner in which the customized offer is obtained can vary.

For example, at 211, the custom offer agent receives the customized offer in print media delivered by a customer to a POS device for redemption. The customer may have acquired the customized offer from a website or as a text on his/her phone and printed out the customized offer. Alternatively, the customized offer may have been provided in print form in a magazine, newspaper, etc. and acquired from the customer.

In another case, at 212, the custom offer agent receives the customized offer as a bar code or QR code provided to a scanner of the POS device by a customer from a portable device of the customer, such as a smart phone.

In yet another situation, at 213, the custom offer agent receives the customized offer as a NFC code delivered from a portable device of the customer to a NFC device of the POS device.

In another circumstance, at 214, the custom offer agent receives the customized offer, which is dynamically delivered on a display screen manned by a cashier at the POS device and pushed from the enterprise retail offer management system.

In one case, at 215, the custom offer agent receives the customized offer, which is dynamically delivered on a display screen of a device used by a customer where the transaction occurs over the Internet at a website.

At 220, the custom offer agent redeems the customized offer after successful evaluation by the self-contained customized offer package at the enterprise retail offer management system.

At 230, the custom offer agent adjusts a transaction price for a transaction. The adjustment is based on the successful evaluation of the customized offer by the self-contained customized offer package.

Figure 3:
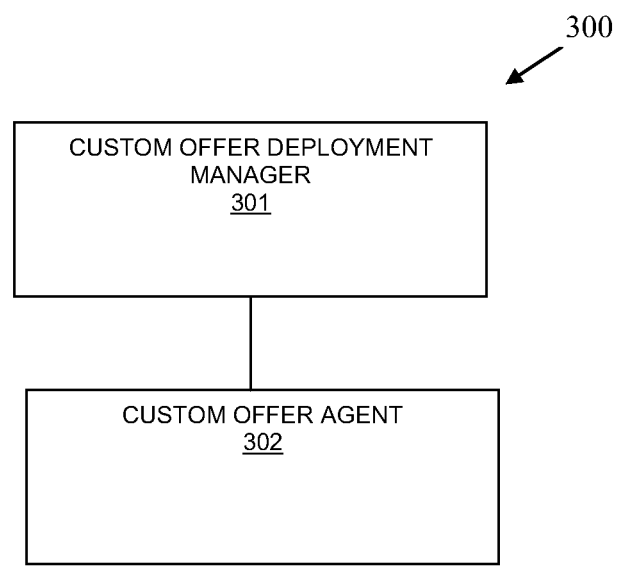
FIG. 3 is a diagram of a customized offer deployment and processing system, according to an example embodiment.

FIG. 3 is a diagram of a customized offer deployment and processing system 300, according to an example embodiment. The components of the customized offer deployment and processing system 300 are implemented as executable instructions and programmed within a non-transitory computer-readable (processor-readable) storage medium that execute on one or more processors of an enterprise server system and one or more processors of a device where custom offers are redeemed and handled as discussed above with reference to the FIG. 2; the processors of these devices are specifically configured to execute the components of the customized offer deployment and processing system 300. The customized offer deployment and processing system 300 is also operational over a network; the network is wired, wireless, or a combination of wired and wireless.

The customized offer deployment and processing system 300 includes a scanning agent 301 and a validation agent 302. In an embodiment, the retail self-checkout system 300 also includes a weight confirmation agent 303. Each of these components and the interactions of each component are now discussed in turn.

The retail self-checkout system 300 includes a custom offer deployment manager 301 and a custom offer agent 302. Each of these components and their interactions with one another will now be discussed in turn.

The customized offer deployment and processing system 300 includes one or more processors of an enterprise (retail-based) server, the processors configured with the custom offer deployment manager 301, which is implemented, programmed, and resides within a non-transitory computer-readable storage medium and executes on the one or more processors. Example processing associated with the custom offer deployment manager 301 was presented in detail above with reference to the FIG. 1.

The custom offer deployment manager 301 is configured to encapsulate a custom offer as a package that includes a document descriptor, a document presenter, and a plug-in executor. The custom offer deployment manager 301 is also configured to deploy the package as a self-contained processing environment within an enterprise retail offer management system.

The customized offer deployment and processing system 300 also includes one or more processors of a POS device (mobile device, self-service kiosk, desktop device, cashier-manned station, etc.), the processors configured with the custom offer agent 302, which is implemented, programmed, and resides within a non-transitory computer-readable storage medium and executes on the one or more processors. Example processing associated with the custom offer agent 302 was presented in detail above with reference to the FIG. 2.

The custom offer agent 302 is configured to receive the custom offer and redeem the custom offer via the POS device and in accordance with conditions defined in the package and as processed and evaluated by the plug-in executor of the package.

According to an embodiment, the POS device is a portable device owned and operated by the consumer, such as a phone or tablet.

In another case, the POS device is a self-service kiosk checkout station or a cashier-manned checkout station located at a retail establishment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for packaging a self-contained custom offer processing environment, the method implemented as executable instructions that are programmed in a non-transitory computer-readable medium and executes on a hardware server, the method comprising:

receiving, by the server, a document descriptor that identifies items and conditions for providing a customized offer, the document descriptor received by a contracting vendor, the server operated by a third party contracted by the contracting vendor to provide the self-contained custom offer processing environment, wherein the conditions including expiration dates and geographic limitations associated with the customized offer;

acquiring, by the server, a document presenter that defines how the customized offer is presented, the document presenter defines how the customized offer is presented and processed by a mobile device operated by a particular customer and presented or processed by a Point-Of-Sale (POS) device operated by the particular customer or a cashier;

obtaining, by the server, a plug-in executor configured to execute the conditions using the items to present the customized offer as defined by the document presenter, the plug-in executor including a plurality of standardized components having information about the plurality of components, the information including evaluation criteria and rewards;

assembling, by the server, an offer plugin that comprises the document descriptor, the document presenter, and the plug-in executor, and configuring the offer plugin with access limited to the document descriptor, the document presenter, and the plug-in executor, the offer plugin when processed performs a sequence of operations including: identifying the document descriptor, the document presenter, and executing the plugin-executor, and wherein the plug-in executor configured with limited and predefined access from the deployed environment to resources of an enterprise retail offer management system, and the plugin-executer performs processing of: operating in the deployed environment as the self-contained custom offer processing environment with the limited and predefined access to the resources of enterprise retail offer management system, and processing the customized offer within the self-contained custom offer processing environment; and packaging, by the server, the document descriptor, the document presenter, and the plug-in executor into an encapsulated customized offer representing the offer plugin, and deploying an encapsulated customized offer to the deployed environment for interaction with the resources of the enterprise retail offer management system and establishing the self-contained custom offer processing environment within the deployed environment, and when the encapsulated customized offer deploys to the deployed environment, an executing version of the encapsulated customer offer utilizing the plug-in executor and enterprise legacy systems representing the resources in during the enterprise retail offer management system, wherein utilizing the enterprise legacy systems includes the executing version of the encapsulated customer offer having access to the resources that include: a customer points program, an issuance submission module, and a rewards generation engine of the enterprise legacy systems.

2. The method of claim 1 further comprising, processing the method as a user-interface presented to a user from the enterprise retail offer management system.

3. The method of claim 1 further comprising, assigning security rights to the encapsulated customized offer.

4. The method of claim 1 further comprising, executing the plug-in executor on the server in response to satisfaction of the evaluation criteria and a command, an event, or a particular policy evaluation.

5. The method of claim 1, wherein receiving further includes configuring at least some items and at least some conditions for conditional access to predefined resources of the enterprise retail offer management system.

6. The method of claim 5, wherein configuring further includes identifying the resources as one or more of: customer account details and customer reward details.

7. The method of claim 1, wherein acquiring further includes configuring the document presenter to present the custom offer based on a POS device that subsequently attempts to redeem the custom offer.

8. The method of claim 7, wherein configuring further includes accounting for POS devices that include: a self-service kiosk used by a customer, a cashier-manned station used by a cashier on behalf of the customer, and the mobile device used by the customer.

9. The method of claim 1, wherein obtaining further includes configuring the plug-in executor as a self-contained and restricted processing environment with limited and predefined access to resources of the enterprise retail offer management system.

10. The method of claim 1, wherein packaging further includes configuring the enterprise retail offer management system to display the custom offer and activate the encapsulated customized offer via the plug-in executor once deployed in the enterprise retail offer management system.

11. The method of claim 1, wherein packaging further includes representing the encapsulated customized offer as an object recognized and callable from within the enterprise retail offer management system.

12. A method for dynamic processing of a self-contained custom offer processing environment, the method implemented as executable instructions and programmed in a non-transitory computer-readable medium and executed on one or more hardware processors of a Point-Of-Sale (POS) device, the method comprising:

obtaining, by the POS device, a customized offer from a self-contained customized offer package available from an enterprise retail offer management system, the self-contained customized offer including a plug-in executor configured to execute a plurality of standardized components having information about the plurality of components within a limited access portion of the enterprise retail offer management system as a self-contained customized offer processing environment, the information including evaluation criteria and rewards, the enterprise retail offer management system operated by a third party contracted by an operator of the POS device to provide the self-contained custom offer processing environment, wherein the evaluation criteria including conditions and the conditions including expiration dates and geographical limitations for the customized offer, and wherein the POS device, processing the self-contained offer package by obtaining an offer plugin from the self-contained offer package, and the offer plugin comprising: 1) a document descriptor that defines the evaluation criteria for the self-contained customized offer, 2) a presenter module that defines how the self-contained customized offer is presented, and 3) the plug-in executor, and wherein the plug-in executor when processed: a) establishing the self-contained customized offer processing environment with limited access within the portion of the enterprise retail offer management system, b) evaluating the evaluation criteria from the document descriptor within the self-contained customized offer processing environment, and c) providing the customized offer from the self-contained customized offer processing environment;

redeeming, by the POS device, the customized offer after successful evaluation by the self-contained customized offer package at the enterprise retail offer management system wherein redeeming occurs based on how the customized offer is presented for redemption by the presenter module embedded in that package, wherein redeeming further includes dynamically executing the self-contained customized offer package on the POS device as the self-contained custom offer processing environment by the plug-in executor and utilizing by the plug-in executor enterprise legacy systems during processing of the offer package, wherein utilizing the enterprise legacy systems includes accessing a customer points program, an issuance submission module, and a rewards generation engine of the enterprise legacy systems; and adjusting, by the POS device, a transaction price for a transaction, the adjustment is based on the successful evaluation of the customized offer by the self-contained customized offer package.

13. The method of claim 12, wherein obtaining further includes receiving the customized offer in print media delivered by a customer to the POS device.

14. The method of claim 12, wherein obtaining further includes receiving the customized offer as a bar code or Quick Response (QR) code provided to a scanner of the POS device by a customer from a portable device of a customer.

15. The method of claim 12, wherein obtaining further includes receiving the customized offer as a Near Field Communication (NFC) delivered from a portable device of a customer to a NFC device of the POS device.

16. The method of claim 12, wherein obtaining further includes receiving the customized offer dynamically on a display screen manned by a cashier at the POS device and pushed from the enterprise retail offer management system.

17. The method of claim 12, wherein obtaining further includes receiving the customized offer dynamically on a display screen of a device used by a customer where the transaction occurs over the Internet at a website.

18. A system for dynamic processing of a self-contained custom offer processing environment, the system comprising:
a hardware server configured with a custom offer deployment manager implemented as executable instructions within a non-transitory computer-readable storage medium and that executes on one or more processors of the server; and
a Point-Of-Sale (POS) device configured with a custom offer agent implemented as executable instructions within a non-transitory computer-readable storage medium and that executes on one or more hardware processors of the POS device;
wherein the custom offer deployment manager is configured to encapsulate a custom offer as a package that includes a document descriptor, a document presenter, an offer plugin and a plug-in executor, the plug-in executor including a plurality of standardized components having information about the plurality of components, the information including evaluation criteria and rewards, the custom offer deployment manager also configured to deploy the package as a self-contained processing environment within a portion of an enterprise retail offer management system with limited access for dynamic execution on the POS device, the custom offer agent is configured to receive the custom offer and redeem the custom offer via the POS device and in accordance with conditions defined in the package by the evaluation criteria and as processed by the plug-in executor of the package executing on the POS device, wherein the conditions including expiration dates and geographic limitations associated with the custom offer, wherein the document presenter is configured to define how the customized offer is delivered for processing by a mobile device of a particular customer or the POS device operated by a cashier or the particular customer, wherein the package is configured to be dynamically executed on the POS device as the self-contained offer processing environment, and the package is configured during processing of the package on the POS device to utilize enterprise legacy systems, wherein utilizing the enterprise legacy systems includes the package executing on the POS having access to a customer points program, an issuance submission module, and a rewards generation engine of the enterprise legacy systems, the hardware server operated by a third party contracted by an operator of the POS device to provide the self-contained custom offer processing environment, wherein the offer plugin includes: the document descriptor, the document presenter, and the plug-in executor, and wherein the offer plugin when processed identifies the document descriptor and the document presenter and processes the plug-in executor, the plug-in executor when processed establishes the self-contained custom offer processing environment within the portion of the enterprise retail offer management system with limited access, evaluates the evaluation criteria from the document descriptor, and provides the custom offer within the self-contained customer offer processing environment.

19. The system of claim 18, wherein the POS device is a self-service kiosk checkout station or a cashier-manned checkout station at a retail establishment.

* * * * *